US011912036B2

(12) United States Patent
Shimada et al.

(10) Patent No.: US 11,912,036 B2
(45) **Date of Patent: *Feb. 27, 2024**

(54) INK TANK AND INK JET PRINTING APPARATUS

(71) Applicant: CANON KABUSHIKI KAISHA, Tokyo (JP)

(72) Inventors: Koki Shimada, Kawasaki (JP); Hideaki Matsumura, Kawasaki (JP); Masaya Shimmachi, Kawasaki (JP); Yukimichi Kimura, Kawasaki (JP); Junichi Kubokawa, Kawasaki (JP); Takahiro Kiuchi, Fuchu (JP); Yusuke Tanaka, Kawasaki (JP); Kyohei Sato, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/489,558

(22) Filed: Sep. 29, 2021

(65) Prior Publication Data

US 2022/0016891 A1 Jan. 20, 2022

Related U.S. Application Data

(63) Continuation of application No. 16/370,695, filed on Mar. 29, 2019, now Pat. No. 11,167,556, which is a (Continued)

(30) Foreign Application Priority Data

Oct. 30, 2015 (JP) ................................ 2015-214969

(51) Int. Cl.
*B41J 2/175* (2006.01)

(52) U.S. Cl.
CPC .......... *B41J 2/17503* (2013.01); *B41J 2/175* (2013.01); *B41J 2/1754* (2013.01); (Continued)

(58) Field of Classification Search
CPC .. B41J 2/17513; B41J 2/17523; B41J 2/1754; B41J 2/17553
See application file for complete search history.

(56) References Cited

U.S. PATENT DOCUMENTS

2011/0100998 A1* 5/2011 Komaki .............. B41J 2/17513 220/500
2012/0013687 A1 1/2012 Ishizawa et al.

FOREIGN PATENT DOCUMENTS

JP 4707498 B2 * 6/2011
JP 2013-184433 A 9/2013
JP 2017-081123 A 5/2017

* cited by examiner

*Primary Examiner* — Sharon Polk
(74) *Attorney, Agent, or Firm* — CANON U.S.A., INC. IP Division

(57) ABSTRACT

An ink tank that enables to check whether a cover of an ink tank is normally bonded to the ink tank includes a first chamber having a supply port for supplying ink to a printing head that ejects ink, a second chamber having an external air introduction port capable of introducing external air, a partition wall configured to separate the first chamber and the second chamber, a communication path provided in the partition wall and configured to place the first chamber and the second chamber in communication with each other, a first cover member configured to cover an opening of the first chamber without extending over an opening of the second chamber, and a second cover member configured to cover the opening of the second chamber without extending over the opening of the first chamber.

32 Claims, 12 Drawing Sheets

Related U.S. Application Data continuation of application No. 15/336,572, filed on Oct. 27, 2016, now Pat. No. 10,272,688.

(52) U.S. Cl.
CPC ....... *B41J 2/17513* (2013.01); *B41J 2/17523* (2013.01); *B41J 2/17553* (2013.01); *B41J 2/17559* (2013.01)

INK TANK AND INK JET PRINTING APPARATUS

CROSS-REFERENCE TO RELATED APPLICATIONS

This application is a continuation of U.S. patent application Ser. No. 16/370,695, filed Mar. 29, 2019, which is a continuation of U.S. patent application Ser. No. 15/336,572, filed Oct. 27, 2016, now U.S. Pat. No. 10,272,688 issued Apr. 30, 2019, which claims the benefit of Japanese Patent Application No. 2015-214969, filed Oct. 30, 2015, each of which is hereby incorporated by reference herein in their entirety.

BACKGROUND OF THE INVENTION

Field of the Invention

Aspects of the present disclosure relate to an ink tank used for an ink jet printing apparatus that ejects ink and records an image, and the ink jet printing apparatus including the ink tank.

Description of the Related Art

Japanese Patent Application Laid-Open No. 2007-253328 discusses an ink tank including an ink chamber that contains ink, an ink supply port provided in the ink chamber, and an external air introduction path that introduces external air into the ink chamber as the ink is consumed, and an air chamber provided halfway in the external air introduction path.

In the ink tank, even if the air in the ink chamber thermally expands due to a change in environment temperature and the ink in the ink chamber flows back through the external air introduction path, the ink can be stored in the air chamber so that the ink can be prevented from leaking to the outside.

In the ink tank discussed in Japanese Patent Application Laid-Open No. 2007-253328, respective covers for covering an opening of the ink chamber and an opening of the air chamber need to be provided and bonded thereto in a manufacturing process. At this time, in a case where there is an adhesion failure in thermal welding or ultrasonic welding or a component failure such as a step or a recess between the ink chamber and the air chamber, the cover does not normally adhere to the ink tank, so that a gap may be made between adhesive surfaces. When such a gap is made, air enters the ink chamber from not the external air introduction path but the gap. As a result, the function of the air chamber of preventing ink from leaking to the outside may not be sufficiently exhibited.

SUMMARY OF THE INVENTION

Aspects of the present disclosure are directed to providing an ink tank that enables to check whether a cover of the ink tank is normally bonded to the ink tank.

According to an aspect of the present disclosure, an ink tank includes a first chamber having a supply port for supplying ink to a printing head that ejects ink and configured to contain ink, a second chamber having an external air introduction port capable of introducing external air and configured to contain air, a partition wall configured to separate the first chamber and the second chamber, a communication path provided in the partition wall and configured to place the first chamber and the second chamber in communication with each other, a first cover member configured to cover an opening of the first chamber without extending over an opening of the second chamber, and a second cover member configured to cover the opening of the second chamber without extending over the opening of the first chamber.

Further features of the present disclosure will become apparent from the following description of exemplary embodiments with reference to the attached drawings.

DESCRIPTION OF THE EMBODIMENTS

A first exemplary embodiment will be specifically described below with reference to the drawings.

Figure 1:
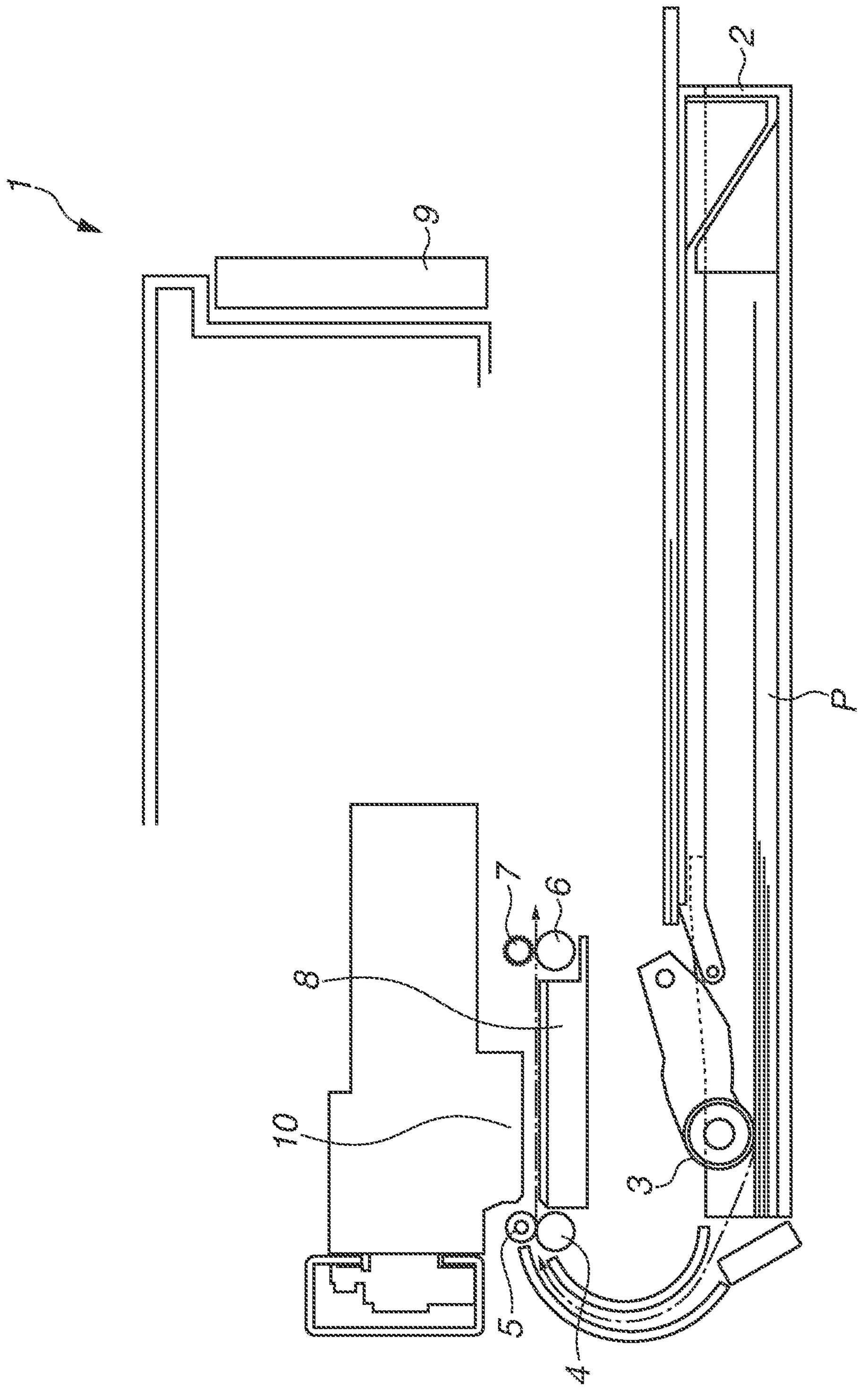
FIG. 1 is a schematic sectional view of an ink jet printing apparatus including an ink tank according to a first exemplary embodiment.

FIG. 1 is a schematic sectional view of an ink jet printing apparatus including an ink tank (ink cartridge) according to a first exemplary embodiment. An ink jet printing apparatus 1 includes a cassette 2 loaded with printing media (sheets) P, a feeding roller 3 that feeds the printing medium P, a conveyance roller 4 that conveys the printing medium P, a printing head 10 in which an ejection port for ejecting ink is arranged, and a discharge roller 6 that discharges the printing medium P.

The printing media P loaded on the cassette 2 are separated one by one by the feeding roller 3, and the printing medium P is fed to the conveyance roller 4 while being guided by a sheet guide. The printing medium P, which has reached the conveyance roller 4, is pinched between the conveyance roller 4 and a pinch roller 5, and is conveyed to a position where it opposes the printing head 10 while being supported from below by a platen 8. The printing head 10 is removably mounted on a carriage. The carriage is supported movably in a direction perpendicular to a conveyance direction of the printing medium P. Ink is ejected by the printing head 10 while the carriage is moving, and an image corresponding to one band is formed on the conveyed printing medium P. The printing medium P on which the image corresponding to one band is formed is intermittently conveyed by a predetermined conveyance amount to form an image corresponding to a subsequent one band thereon. Such an intermittently conveying operation and an image forming operation are alternately repeated so that an image is formed on the entire printing medium P. The printing medium P on which the image has been formed is pinched between a discharge roller 6 and a spur roller 7 and is conveyed to discharge onto a discharge tray (not illustrated).

A configuration of the ink tank according to the first exemplary embodiment will be described below.

Figure 2A:
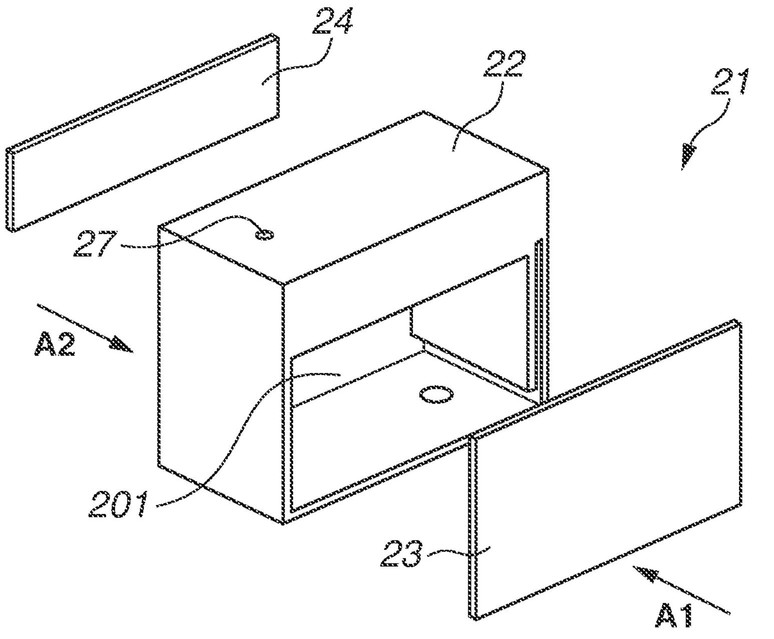
FIGS. 2A and 2B are respectively perspective views of the ink tank according to the first exemplary embodiment.
Figure 2B:
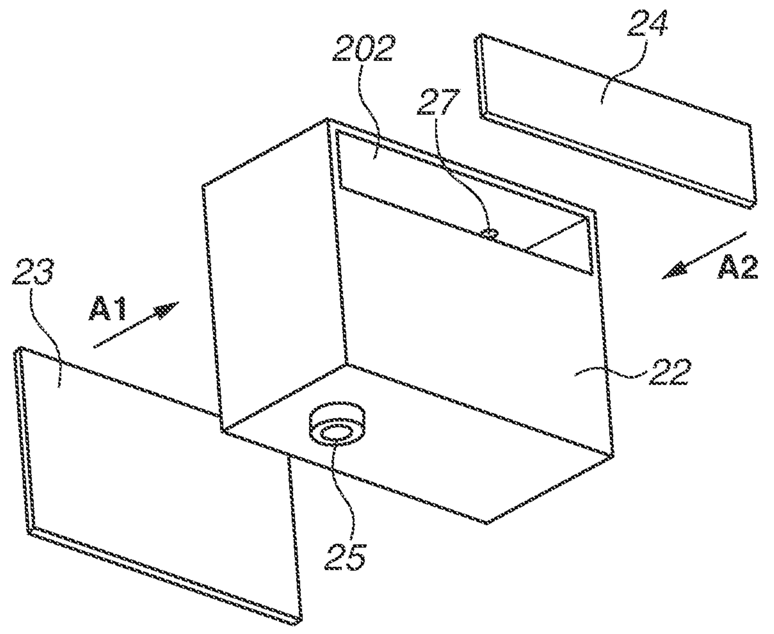
Figure 3A:
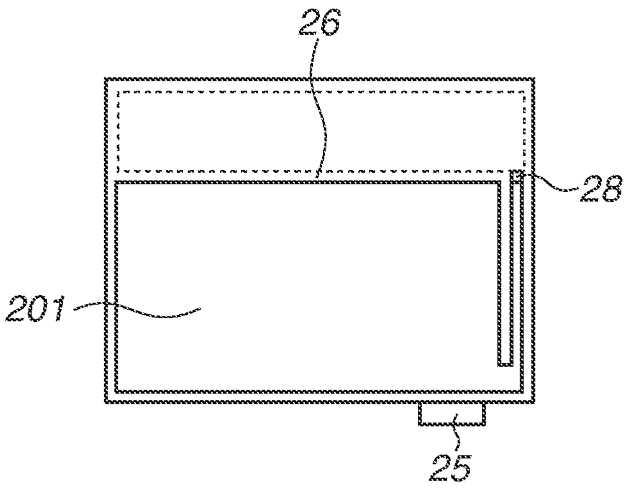
FIGS. 3A and 3B are respectively side views of the ink tank according to the first exemplary.
Figure 3B:
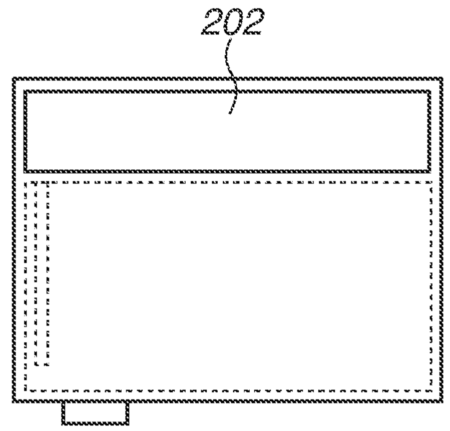

FIGS. 2A and 2B are respectively perspective views of an ink tank 21 according to the first exemplary embodiment. FIG. 2B is a perspective view of the ink tank 21 viewed from a side opposite to a side illustrated in FIG. 2A. FIGS. 3A and 3B are respectively side view of the ink tank 21 according to the present exemplary embodiment. FIG. 3A is a side view of the ink tank 21 viewed from an A1 direction in FIG. 2, and FIG. 3B is a side view of the ink tank 21 viewed from an A2 direction in FIG. 2.

The ink tank 21 is removably mounted on a mounting portion provided in the carriage. The ink tank 21 is mounted for each corresponding ink color (e.g., black Bk, cyan C, magenta M, or yellow Y). The ink tank 21 contains ink to be supplied to the printing head 10. The ink tank 21 includes a tank container 22, a first cover member 23, and a second cover member 24. The ink tank 21 includes an ink chamber (first chamber) 201 serving as a space for containing ink and an air chamber (second chamber) 202 serving as a space for containing air. The air chamber 202 is provided above the ink chamber 201. A partition wall 26 separates the ink chamber 201 and the air chamber 202. An opening of the ink chamber 201 is covered with a first cover member 23. An opening of the air chamber 202 is covered with a second cover member 24. An ink supply port 25 for connecting and communicating the ink chamber 201 and an ink receiving portion of the printing head 10 with each other is provided on a bottom surface of the ink chamber 201. An external air introduction port 27 capable of introducing external air into the ink chamber 201, which communicates with the atmosphere, as ink in the ink chamber 201 is consumed is provided on an upper surface of the air chamber 202. The partition wall 26 between the ink chamber 201 and the air chamber 202 is provided with a minute communication portion (communication path) 28. The ink chamber 201 and the air chamber 202 are in communication with each other via the communication path 28. The ink chamber 201 is in communication with the atmosphere by the external air introduction port 27 via the communication path 28 and the air chamber 202. The air chamber 202 usually contains air. However, the air chamber 202 can contain ink in its inner part so that the ink does not leak to the outside when the ink flows back through the communication path 28 because the air in the ink chamber 201 thermally expands.

The first cover member 23 and the second cover member 24 are bonded to the tank container 22 to form the ink chamber 201 and the air chamber 202, respectively, by a method such as ultrasonic welding or thermal welding. After the adhesion, a leak check (described below) is performed to check whether the first cover member 23 and the second cover member 24 are normally bonded to the tank container 22. The leak check is for checking whether there is a gap between an adhesive surface of the ink tank 21 and the cover. If there is a gap, a problem that, for example, the ink in the ink tank 21 may leak out, and the ink that has flowed back due to thermal expansion cannot be contained in the air chamber 202 may occur.

Figure 4:
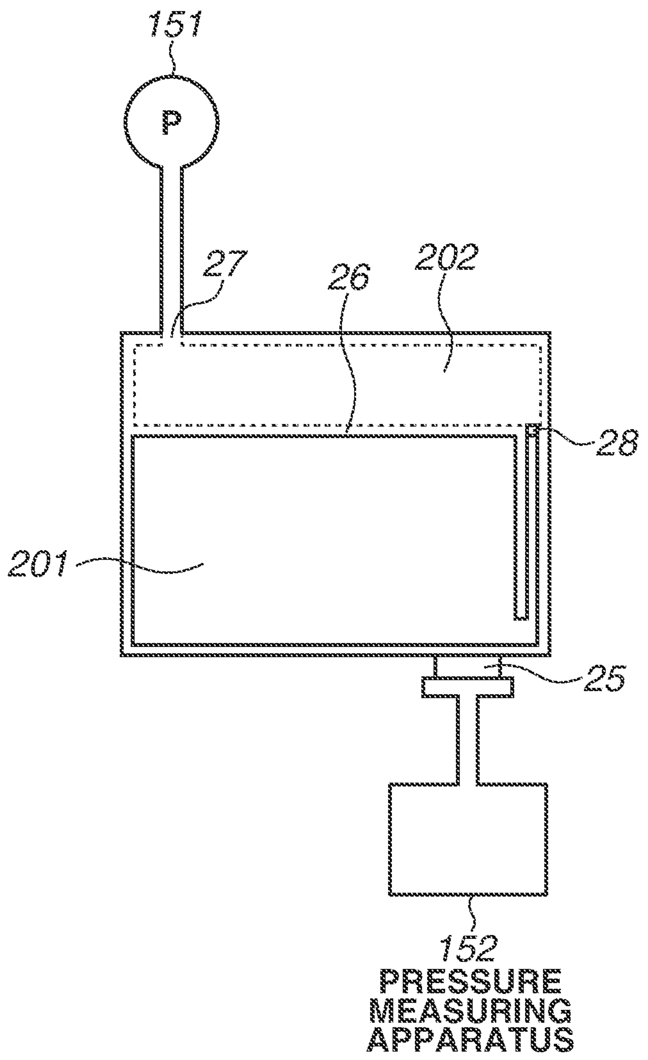
FIG. 4 is a schematic view of the ink tank according to the first exemplary embodiment at a time of a leak check.

A leak checking method in the present exemplary embodiment will be described below. FIG. 4 is a schematic view of the ink tank 21 according to the present exemplary embodiment at a time of a leak check. In the present exemplary embodiment, a pressure pump 151 is attached to the external air introduction port 27 of the ink tank 21 during the leak check. A pressure measuring apparatus 152 is attached to an ink supply port 25 of the ink tank 21. The pressure measuring apparatus 152 measures internal pressure of the ink tank 21 while the pressure pump 151 is feeding air into the ink tank 21. At this time, in a case where the internal pressure of the ink tank 21 has increased, the adhesive surface of the ink tank 21 is found bonded to the cover with no gap therebetween. On the other hand, in a case where the internal pressure does not increase even if air is fed into the ink tank 21, air is found leaking out of the adhesive surface of the ink tank 21.

Figure 5A:
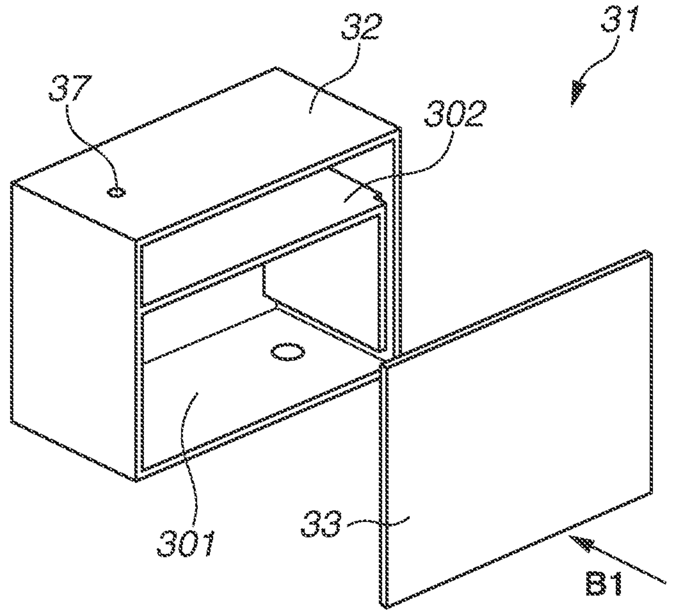
FIG.5A Prior Art
FIGS. 5A and 5B are respectively a perspective view and a side view of an ink tank according to a conventional technique.
Figure 5B:
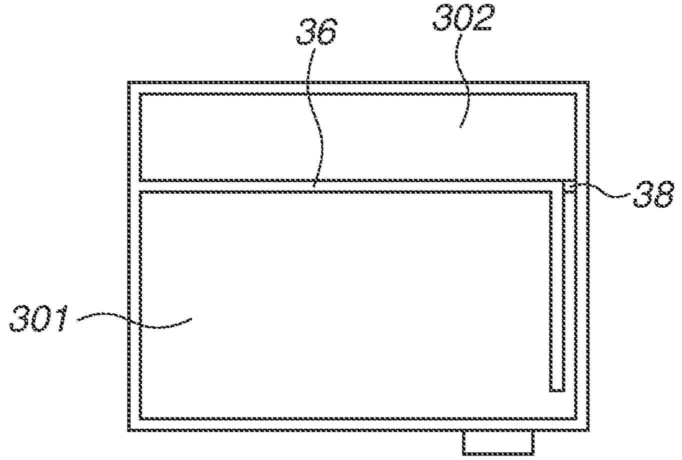
FIG.5B Prior Art

A conventional ink tank 31 has a configuration in which one cover member 33 covering an ink chamber 301 and an air chamber 302 adhere to a tank container 32, as illustrated in FIG. 5. In the ink tank having such a configuration, when the above described leak check is performed, it can be checked whether an outer peripheral portion of the tank container 32 and the cover member 33 are normally bonded to each other. However, it cannot be checked whether a partition wall 36, which separates the ink chamber 301 and the air chamber 302, and the cover member 33 are normally bonded to each other.

In the present exemplary embodiment, the opening of the ink chamber 201 and the opening of the air chamber 202 are respectively formed on different surfaces, and the first cover member 23 covering the opening of the ink chamber 201 and the second cover member 24 covering the opening of the air chamber 202 are separately bonded to the tank container 22. Thus, in the above described leak check, it is also possible to check not only whether the first cover member 23 and the second cover member 24 are normally bonded to respective outer peripheral portions of the tank container 22, but also whether the first cover member 23 and the second cover member 24 are normally bonded to the partition wall 26. As a result, it can be determined that the function of the ink tank 21 has been ensured.

As described above, in the ink tank according to the present exemplary embodiment, it can be checked whether the cover of the ink tank is normally bonded to the ink tank by the above described leak check.

According to aspects of the present disclosure, a space provided in the ink tank is not limited to an ink chamber and an air chamber. A first chamber may contain a negative pressure generation member that holds ink, and a second chamber may contain ink to be supplied to the first chamber. In this case, two covers can also respectively form the first chamber and the second chamber, like in the first exemplary embodiment. Therefore, an ink tank the function of which has been ensured can be determined by a similar leak check.

A second exemplary embodiment of will be described below. Description of a similar configuration to that in the first exemplary embodiment will not be repeated, and only a different portion will be described.

Figure 6A:
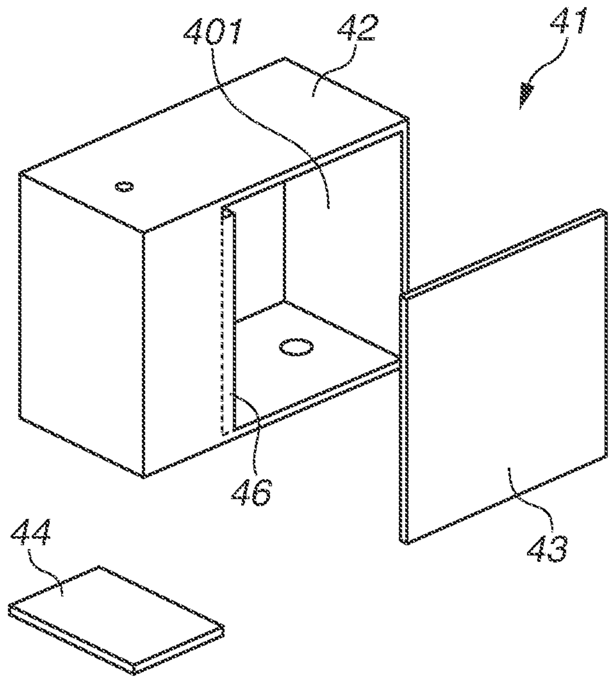
FIGS. 6A and 6B are respectively perspective views of an ink tank according to a second exemplary embodiment.
Figure 6B:
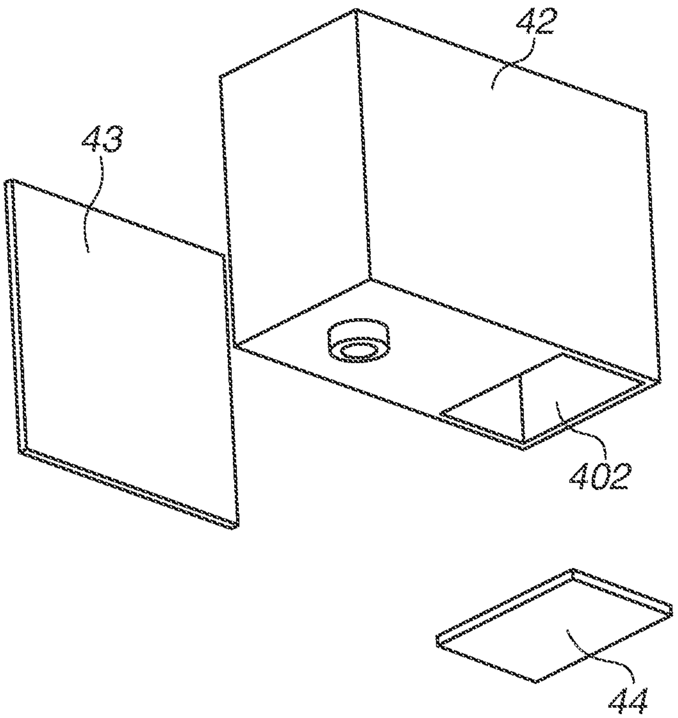

FIG. 6 is a perspective view of an ink tank 41 according to the second exemplary embodiment. The ink tank 41 according to the present exemplary embodiment differs from that according to the first exemplary embodiment in respective directions of an opening of an ink chamber 401 and an opening of an air chamber 402. In the present exemplary embodiment, the ink chamber 401 has the opening on a side surface of the ink tank 41. On the other hand, the air chamber 402 has the opening on a bottom surface of the ink tank 41. Therefore, a first cover member 43 covering the opening of the ink chamber 401 is bonded to a tank container 42 from the side thereof, and a second cover member 44 covering the opening of the air chamber 402 is bonded to the tank container 42 from the bottom thereof.

Even in a case where the ink tank 41 is configured as described above, it can be checked by the leak check illustrated in FIG. 4 whether the first cover member 43 is normally bonded to a partition wall 46, and whether the second cover member 44 is normally bonded to the partition wall 46.

As described above, an effect of the present disclosure can be also obtained in the present exemplary embodiment, like in the first exemplary embodiment.

A third exemplary embodiment will be described below. Description of a similar configuration to that in the first exemplary embodiment will not be repeated, and only a different portion will be described.

Figure 7:
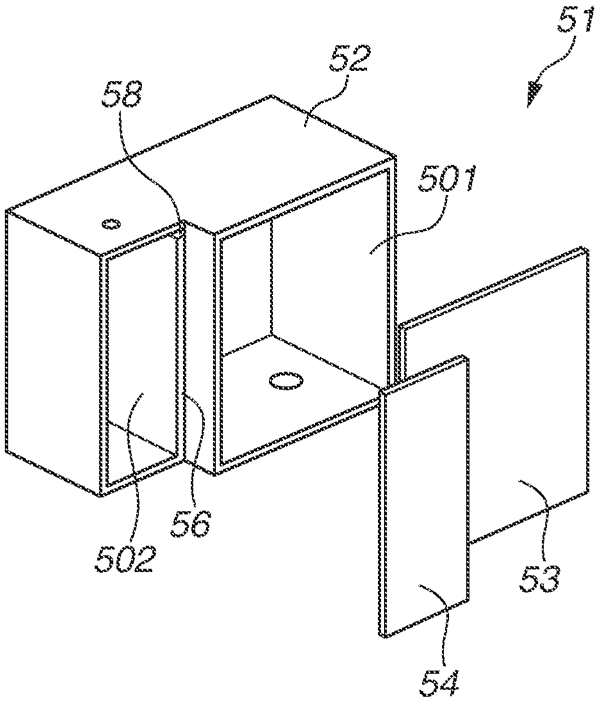
FIG. 7 is a perspective view of an ink tank according to a third exemplary embodiment.

FIG. 7 is a perspective view of an ink tank 51 according to the third exemplary embodiment. In the ink tank 51 according to the present exemplary embodiment, an opening of an ink chamber 501 and an opening of an air chamber 502 are provided on side surfaces of the ink tank 51 facing the same direction. A step is provided between the ink chamber 501 and the air chamber 502 that are separated by a partition wall 56. With such a configuration, instead of adhering one cover member to the opening of the ink chamber 501 and the opening of the air chamber 502 to cover both of the openings, but a first cover member 53 and a second cover member 54 are bonded to the respective openings. The first cover member 53 covers the opening of the ink chamber 501 without extending over the opening of the air chamber 502. The second cover member 54 covers the opening of the air chamber 502 without extending over the opening of the ink chamber 501. Thus, in the ink chamber 501, the tank container 52 and the first cover member 53 form a space. In the air chamber 502, the tank container 52 and the second cover member 54 form a space. The ink chamber 501 and the air chamber 502 are in communication with each other via a communication path 58.

Even in a case where the ink tank 51 is configured as described above, it can be checked by the leak check illustrated in FIG. 4 whether the first cover member 53 is normally bonded to the partition wall 56, and whether the second cover member 54 is normally bonded to the partition wall 56.

As described above, an effect of the present disclosure can be also obtained in the present exemplary embodiment, like in the above described exemplary embodiments.

A fourth exemplary embodiment will be described below. Description of a similar configuration to that in the first exemplary embodiment will not be repeated, and only a different portion will be described.

Figure 8:
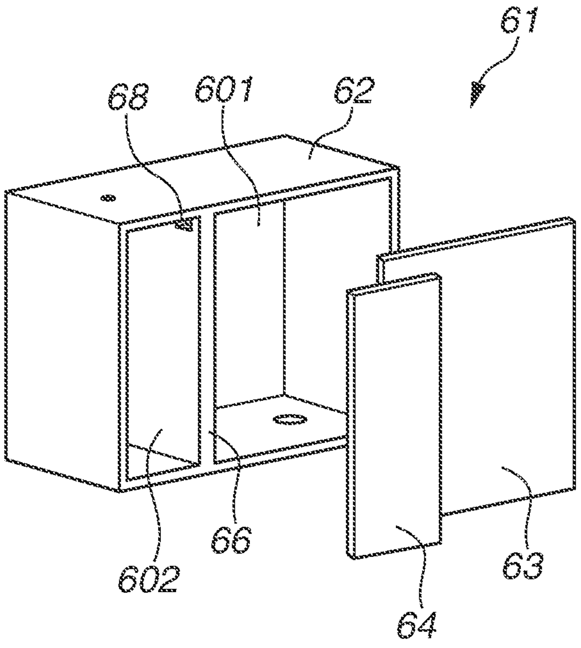
FIG. 8 is a perspective view of an ink tank according to a fourth exemplary embodiment.

FIG. 8 is a perspective view of an ink tank 61 according to the fourth exemplary embodiment. In the ink tank 61 according to the present exemplary embodiment, an opening of an ink chamber 601 and an opening of an air chamber 602 are provided on side surfaces of the ink tank facing the same direction. A step is not provided between the ink chamber 601 and the air chamber 602 that are separated by a partition wall 66. However, a first cover member 63 and a second cover member 64 are separately bonded to the partition wall 66. The first cover member 63 covers the opening of the ink chamber 601 without extending over the opening of the air chamber 602. The second cover member 64 covers the opening of the air chamber 602 without extending over the opening of the ink chamber 601. Thus, in the ink chamber 601, a tank container 62 and the first cover member 63 form a space. In the air chamber 602, the tank container 62 and the second cover member 64 form a space. The ink chamber 601 and the air chamber 602 are in communication with each other via a communication path 68.

Even in a case where the ink tank 61 is configured as described above, it can be checked by the leak check illustrated in FIG. 4 whether the first cover member 63 is normally bonded to the partition wall 66, and the second cover member 64 is normally bonded to the partition wall 66.

As described above, an effect of the present disclosure can be obtained in the present exemplary embodiment, like in the above described exemplary embodiments.

A fifth exemplary embodiment will be described below. Description of a similar configuration to that in the first exemplary embodiment will not be repeated, and only a different portion will be described.

Figure 9:
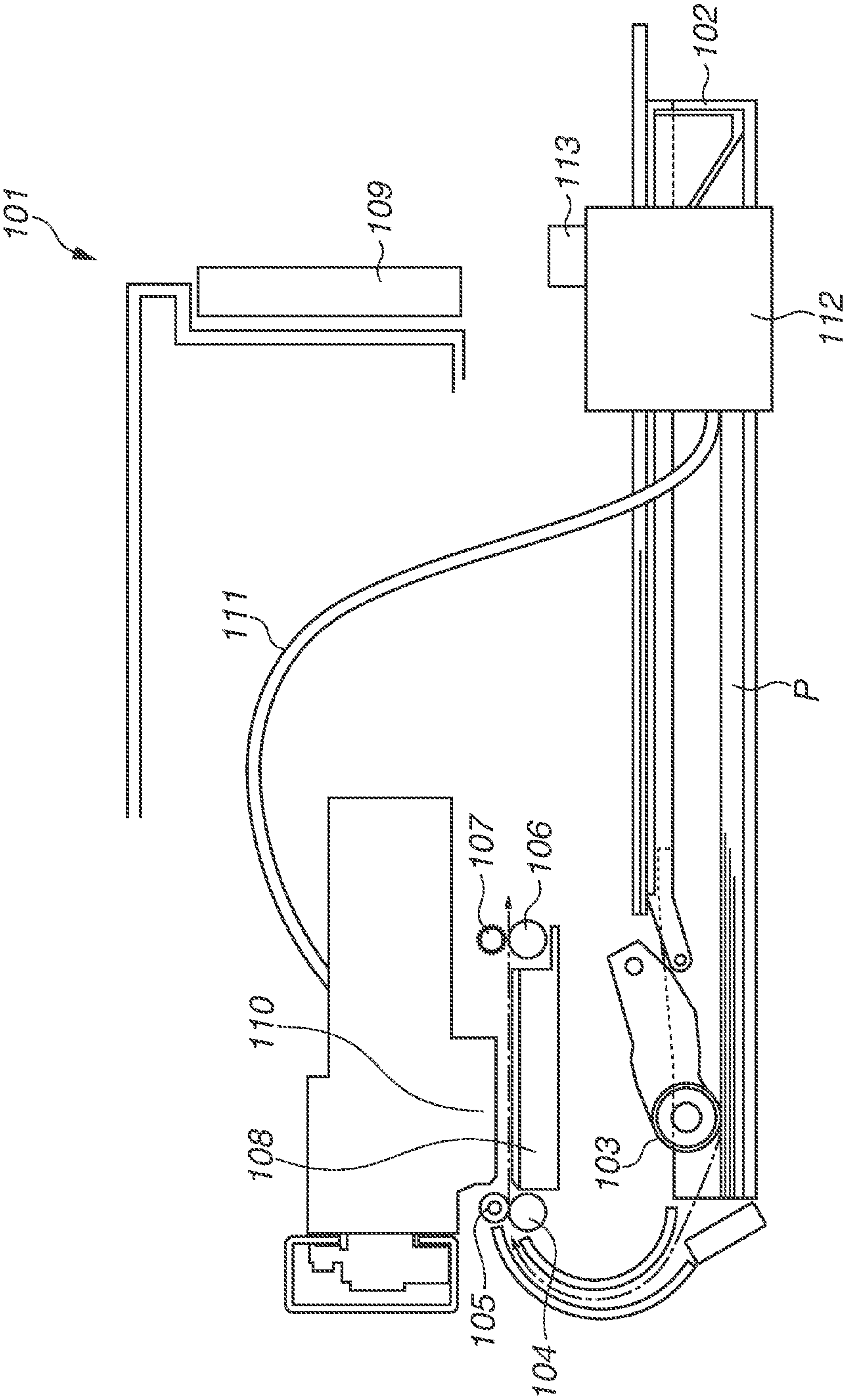
FIG. 9 is a schematic sectional view of an ink jet printing apparatus including an ink tank according to a fifth exemplary embodiment.

FIG. 9 is a schematic sectional view of an ink jet printing apparatus including an ink tank according to the fifth exemplary embodiment. In an ink jet printing apparatus 101 according to the present exemplary embodiment, an ink tank 112 is provided on a front surface of the apparatus body. The ink tank 112 is provided for each corresponding ink color (e.g., black Bk, cyan C, magenta M, or yellow Y). The ink tank 112 and a printing head 110, which is mounted on a carriage, are connected to each other via a supply tube 111. Ink contained in the ink tank 112 is supplied to the printing head 110 via the supply tube 111.

Figure 10A:
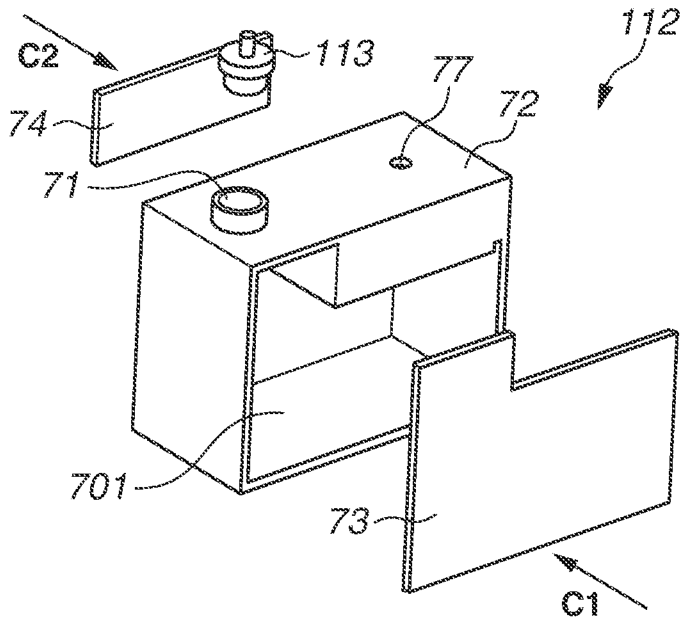
FIGS. 10A and 10B are respectively perspective views of the ink tank according to the fifth exemplary embodiment.
Figure 10B:
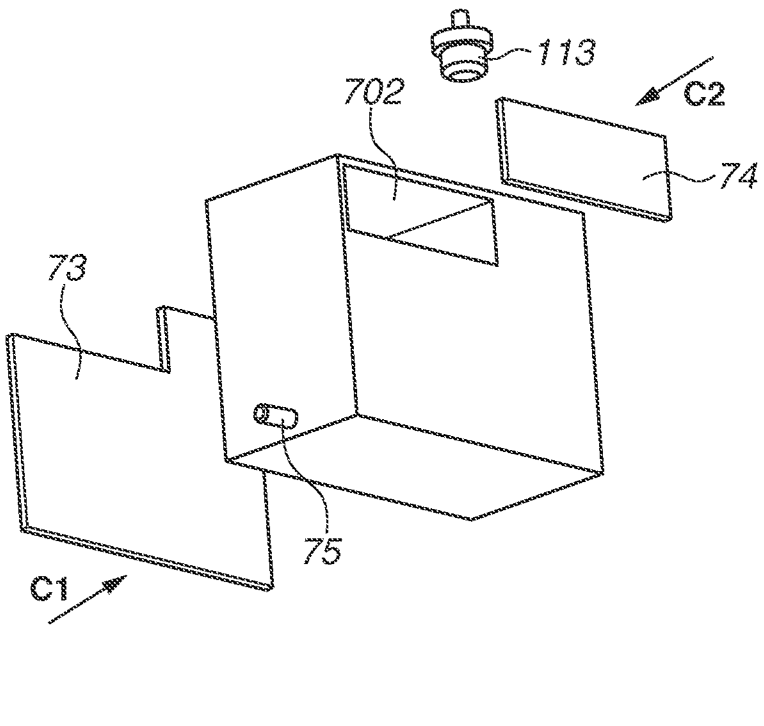
Figure 11A:
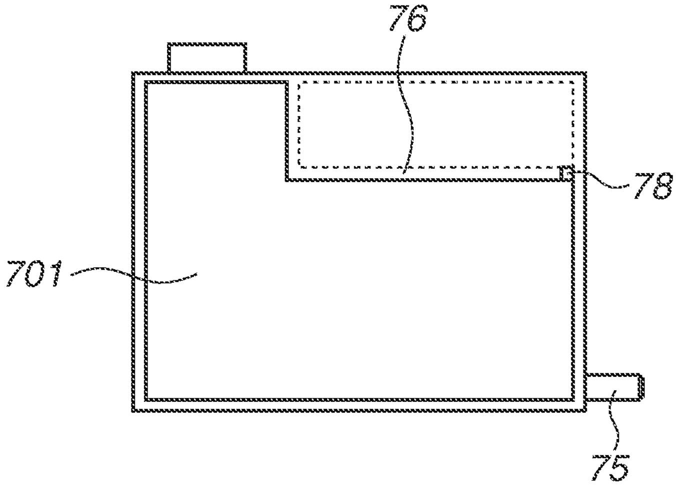
FIGS. 11A and 11B are respectively side views of the ink tank according to the fifth exemplary embodiment.
Figure 11B:
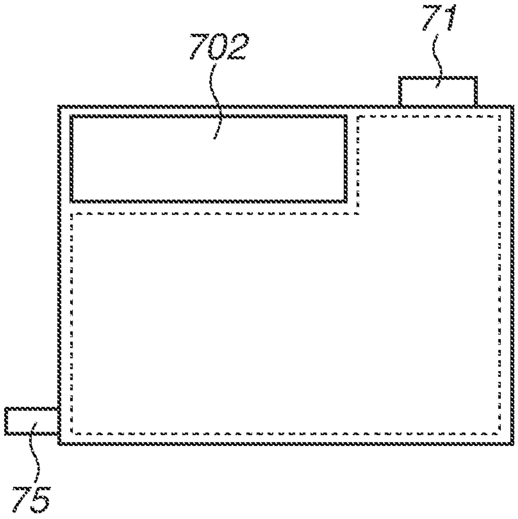

FIGS. 10A and 10B are respectively perspective views of the ink tank 112 according to the fifth exemplary embodiment. FIG. 10B is a perspective view of the ink tank 112 viewed from a side opposite to a side illustrated in FIG. 10A. FIGS. 11A and 11B are side views of the ink tank 112 viewed from a C1 direction and a C2 direction in FIG. 10, respectively.

An ink injection port 71 for a user to inject ink is provided, as illustrated in FIG. 10A, on an upper surface of the ink tank 112. A tank cap 113 for closing the ink injection port 71 is attached to the ink injection port 71. When an amount of ink in the ink tank 112 becomes small, the user can replenish ink into the ink tank 112 by removing the tank cap 113 to expose the ink injection port 71 and injecting the ink from the ink injection port 71.

The ink tank 112 includes a tank container 72, a first cover member 73, and a second cover member 74. The ink tank 112 includes an ink chamber (first chamber) 701 serving as a space for containing ink and an air chamber (second chamber) 702 serving as a space for containing air. The air chamber 702 is provided above the ink chamber 701. A partition wall 76 separates the ink chamber 701 and the air chamber 702. An opening of the ink chamber 701 is covered with the first cover member 73. An opening of the air chamber 702 is covered with the second cover member 74. An ink supply port 75 for connecting a supply tube, which places the ink chamber 701 and a printing head in communication with each other, is provided in the vicinity of a bottom surface of the ink chamber 701. An external air introduction port 77 capable of introducing external air into the ink chamber 701, which is in communication with the atmosphere, as ink in the ink chamber 701 is consumed is provided on an upper surface of the air chamber 702. A partition wall 76 between the ink chamber 701 and the air chamber 702 is provided with a minute communication portion (communication path) 78. The ink chamber 701 and the air chamber 702 are in communication with each other via the communication path 78. The ink chamber 701 is in communication with the atmosphere by the external air introduction port 77 via the communication path 78 and the air chamber 702. While the air chamber 702 usually contains air, the air chamber 702 can contain ink therein so that the ink does not leak to the outside when the ink flows back through the communication path 28 because the air in the ink chamber 701 thermally expands.

Figure 12:
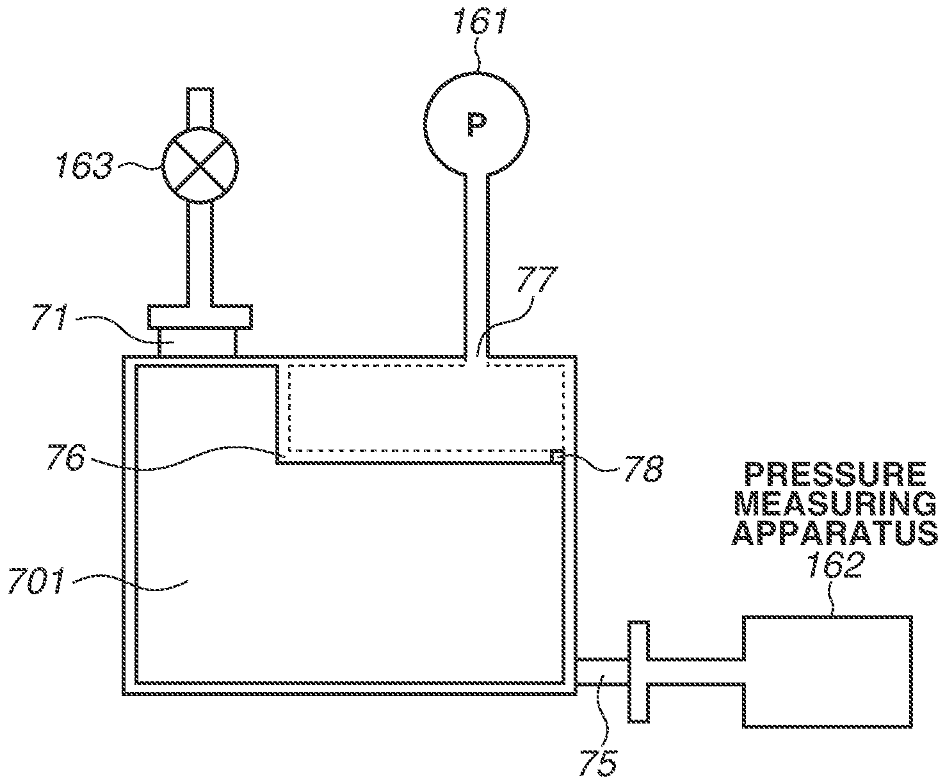
FIG. 12 is a schematic view of the ink tank according to the fifth exemplary embodiment at a time of a leak check.

A leak checking method in the present exemplary embodiment will be described below. FIG. 12 is a schematic view of the ink tank 112 according to the present exemplary embodiment at a time of a leak check. In the present exemplary embodiment, a pressure pump 161 is attached to the external air introduction port 77 of the ink tank 112 during the leak check. A pressure measuring apparatus 162 is attached to the ink supply port 75 of the ink tank 112. A valve 163 closes the ink injection port 71 of the ink tank 112. The pressure measuring apparatus 162 measures internal pressure of the ink tank 112 while the pressure pump 161 is feeding air into the ink tank 112. At this time, in a case where the internal pressure of the ink tank 112 has increased, an adhesive surface of the ink tank 112 and the cover are found bonded to each other with no gap therebetween. On the other hand, in a case where the internal pressure of the ink tank 112 does not increase even if air is fed into the ink tank 112, air is found leaking out of the adhesive surface of the ink tank 121.

In the present exemplary embodiment, the opening of the ink chamber 701 and the opening of the air chamber 702 are respectively formed on different surfaces, and the first cover member 73 covering the opening of the ink chamber 701 and the second cover member 74 covering the opening of the air chamber 702 are separately bonded to the tank container 72. Thus, in the above described leak check, it is possible to check not only whether the first cover member 73 and the second cover member 74 are normally bonded to respective outer peripheral portions of the tank container 72, but also whether the first cover member 73 and the second cover member 74 are normally bonded to the partition wall 76. As a result, an ink tank the function of which has been ensured can be determined.

As described above, in the ink tank according to the present exemplary embodiment, it can be checked whether the cover of the ink tank is normally bonded to the ink tank by the above described leak check.

In other words, aspects of the present disclosure can provide an ink tank that enables to check whether a cover of the ink tank is normally bonded to the ink tank.

While aspects of the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An ink tank comprising:

a tank container including:

(i) a first chamber configured to store ink therein, the first chamber having a first opening on a first outer surface of the tank container and a first sidewall on a second outer surface of the tank container, the second outer surface being opposite to the first outer surface, (ii) an injection port, detachably capped by a tank cap, configured to allow the ink to be injected into the first chamber, and (iii) a second chamber configured to store air therein, the second chamber having a second opening on the second outer surface and a second sidewall on the first outer surface;

a first cover configured to cover the first opening and not to cover the second opening; and a second cover configured to cover the second opening and not to cover the first opening.

2. The ink tank according to claim 1, wherein the second chamber is formed above the first chamber.

3. The ink tank according to claim 1, wherein the tank container includes an air introduction port, the air introduction port being formed on an upper surface of the second chamber and configured to introduce external air to the second chamber.

4. The ink tank according to claim 1, wherein the tank container includes a supply port for supplying the ink stored in the first chamber to a print head configured to eject the ink, the supply port being connected to a supply tube for supplying ink to the printing head.

5. The ink tank according to claim 1, wherein the ink tank is provided on a front surface of an ink jet printing apparatus that prints an image.

6. The ink tank according to claim 1, wherein the injection portion is provided on a third outer surface of the tank container, the third outer surface being different from both the first outer surface and the second outer surface.

7. The ink tank according to claim 1, wherein the first chamber and the second chamber are partitioned by a partition portion.

8. The ink tank according to claim 1, wherein the tank container includes an inlet for introducing air into the second chamber.

9. The ink tank according to claim 8, wherein the tank container includes a communication portion for communicating the first chamber with the second chamber, and the first chamber communicates with the atmosphere through the inlet, the second chamber and the communication portion.

10. An ink tank comprising:

a tank container including:

a first chamber configured to store ink therein, the first chamber having a first opening on a surface of the tank container;

a supply port configured to supply ink from the first chamber to a print head that ejects the ink;

an injection port for injecting ink into the first chamber;

a second chamber configured to store air therein and communicate with the first chamber by a communication portion, the second chamber having a second opening on the surface of the tank container; and an air introduction port configured to introduce external air to the second chamber;

a first cover configured to cover the first opening and not to cover the second opening; and a second cover configured to cover the second opening and not to cover the first opening.

11. The ink tank according to claim 10, wherein the second chamber is formed above the first chamber.

12. The ink tank according to claim 10, wherein the air introduction port is formed on an upper surface of the second chamber.

13. The ink tank according to claim 10, wherein the supply port is connected to a supply tube for supplying ink to the printing head.

14. The ink tank according to claim 10, wherein the ink tank is provided on a front surface of an ink jet printing apparatus that prints an image.

15. The ink tank according to claim 10, wherein the injection port is detachably capped by a tank cap.

16. A printing apparatus comprising:
- a print head configured to eject ink; and
- an ink tank configured to store ink to be supplied to the print head, including:
  - a tank container including:
    - (i) a first chamber configured to store ink therein, the first chamber having a first opening on a first outer surface of the tank container and a first sidewall on a second outer surface of the tank container, the second outer surface being opposite to the first outer surface,
    - (ii) an injection port, detachably capped by a tank cap, configured allow the ink to be injected into the first chamber, and
    - (iii) a second chamber configured to store air therein, the second chamber having a second opening on a second outer surface and a second sidewall on the first outer surface,
  - a first cover configured to cover the first opening and not to cover the second opening, and
  - a second cover configured to cover the second opening and not to cover the first opening.

17. The printing apparatus according to claim 16, wherein the second chamber is formed above the first chamber.

18. The printing apparatus according to claim 16, wherein the tank container includes an air introduction port, the air introduction port being formed on an upper surface of the second chamber and configured to introduce external air to the second chamber.

19. The printing apparatus according to claim 16, wherein the tank container includes a supply port for supplying the ink stored in the first chamber to a print head configured to eject the ink, the supply port being connected to a supply tube for supplying ink to the printing head.

20. The printing apparatus according to claim 16, wherein the ink tank is provided on a front surface of the printing apparatus.

21. The printing apparatus according to claim 16, wherein the injection portion is provided on a third outer surface of the tank container, the third outer surface being different from both the first outer surface and the second outer surface.

22. The printing apparatus according to claim 16, wherein the first chamber and the second chamber are partitioned by a partition portion.

23. The printing apparatus according to claim 22, wherein the partition portion defines a part of the first opening.

24. The printing apparatus according to claim 22, wherein the partition portion defines a part of the second opening.

25. The printing apparatus according to claim 16, wherein the tank container includes an inlet for introducing air into the second chamber.

26. The printing apparatus according to claim 25, wherein the tank container includes a communication portion for communicating the first chamber with the second chamber, and the first chamber communicates with the atmosphere through the inlet, the second chamber and the communication portion.

27. A printing apparatus comprising:
- a tank container including:
  - a first chamber configured to store ink therein, the first chamber having a first opening on a surface of the tank container;
  - a supply port configured to supply ink from the first chamber to a print head that ejects the ink;
  - an injection port for injecting ink into the first chamber;
  - a second chamber configured to store air therein and communicate with the first chamber by a communication portion, the second chamber having a second opening on the surface of the tank container; and
  - an air introduction port configured to introduce external air to the second chamber;
- a first cover configured to cover the first opening and not to cover the second opening; and
- a second cover configured to cover the second opening and not to cover the first opening.

28. The printing apparatus according to claim 27, wherein the injection port is detachably capped by a tank cap.

29. The printing apparatus according to claim 27, wherein the second chamber is formed above the first chamber.

30. The printing apparatus according to claim 27, wherein the air introduction port is formed on an upper surface of the second chamber.

31. The printing apparatus according to claim 27, wherein the supply port is connected to a supply tube for supplying ink to the printing head.

32. The printing apparatus according to claim 27, wherein the ink tank is provided on a front surface of the ink jet printing apparatus.

* * * * *